United States Patent [19]

Drapkin

[11] 4,374,440
[45] Feb. 22, 1983

[54] HONEYCOMB

[75] Inventor: Herbert Drapkin, Hidden Hills, Calif.

[73] Assignee: Perma-Comb Systems, Inc., Woodland Hills, Calif.

[21] Appl. No.: 233,295

[22] Filed: Feb. 10, 1981

[51] Int. Cl.³ .............................................. A01K 47/02
[52] U.S. Cl. ................................................ 6/10
[58] Field of Search ............................... 6/2 R, 10, 11

[56] References Cited

U.S. PATENT DOCUMENTS

| 846,396 | 3/1907 | Calvert et al. | 6/10 |
| 2,591,328 | 4/1952 | Yanik | 6/10 |
| 2,604,643 | 7/1952 | Hamilton | 6/2 R X |
| 4,195,379 | 4/1980 | Krasnik | 6/11 |
| 4,280,236 | 7/1981 | Herman | 6/11 X |

FOREIGN PATENT DOCUMENTS 150502  9/1920  United Kingdom ...................... 6/10

Primary Examiner—Robert P. Swiatek
Attorney, Agent, or Firm—Charles H. Schwartz; Ellsworth R. Roston

[57] ABSTRACT

A molded plastic honeycomb formed by two substantially identical half sections, and with each half section including a front face and a back face, the front face including a plurality of regularly spaced hexagonally shaped cells extending inwardly from the front face and with each cell sloping downward at an angle substantially equal to the angle of a natural honeycomb cell and with the bottom wall of each cell formed as a truncated pyramid substantially similar to the shape of a natural honeycomb cell and with the depth of each cell substantially equal to the depth of a natural honeycomb cell, the front face also including integrally molded outwardly extending spacer portions for providing a predetermined spacing between adjacent honeycombs, and the back face including complementary locking portions for providing locking between the complementary locking portions of the back faces of two half sections to produce a single plastic honeycomb from the two half sections and with the plastic honeycomb having opposite front faces including the hexagonally shaped cells for the immediate depositing of honey, and for the queen's egg laying and the rearing of brood.

20 Claims, 9 Drawing Figures

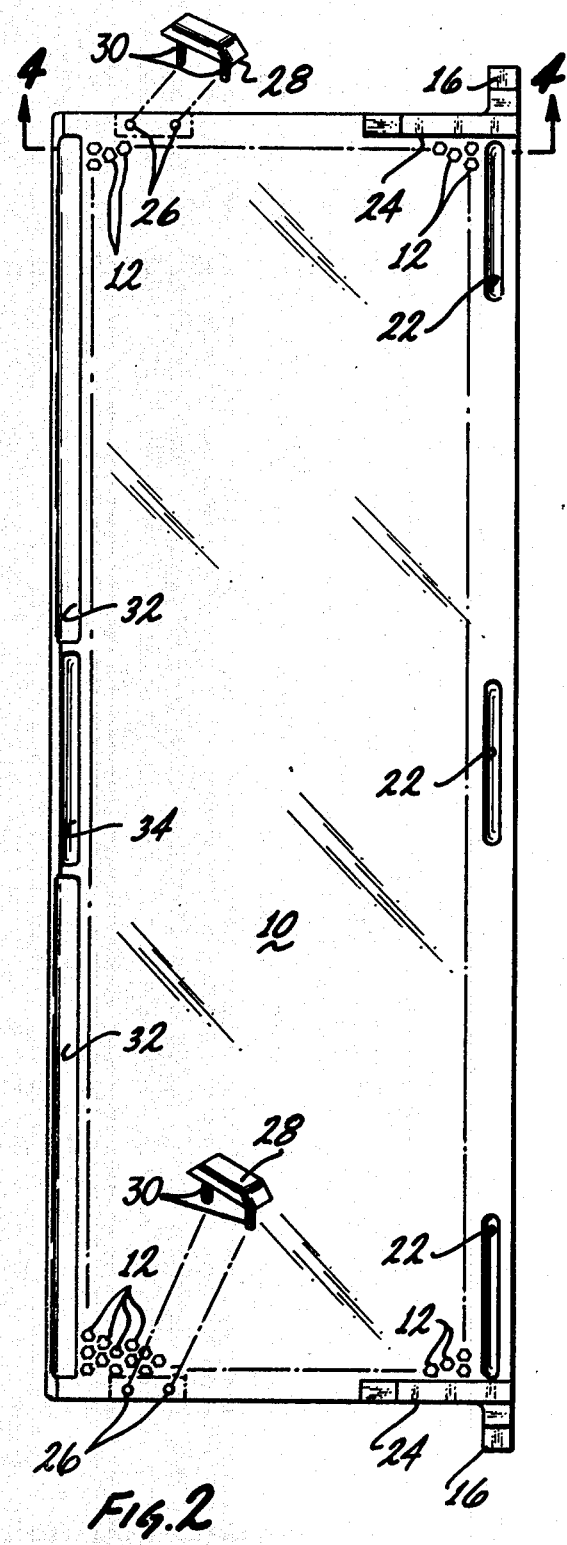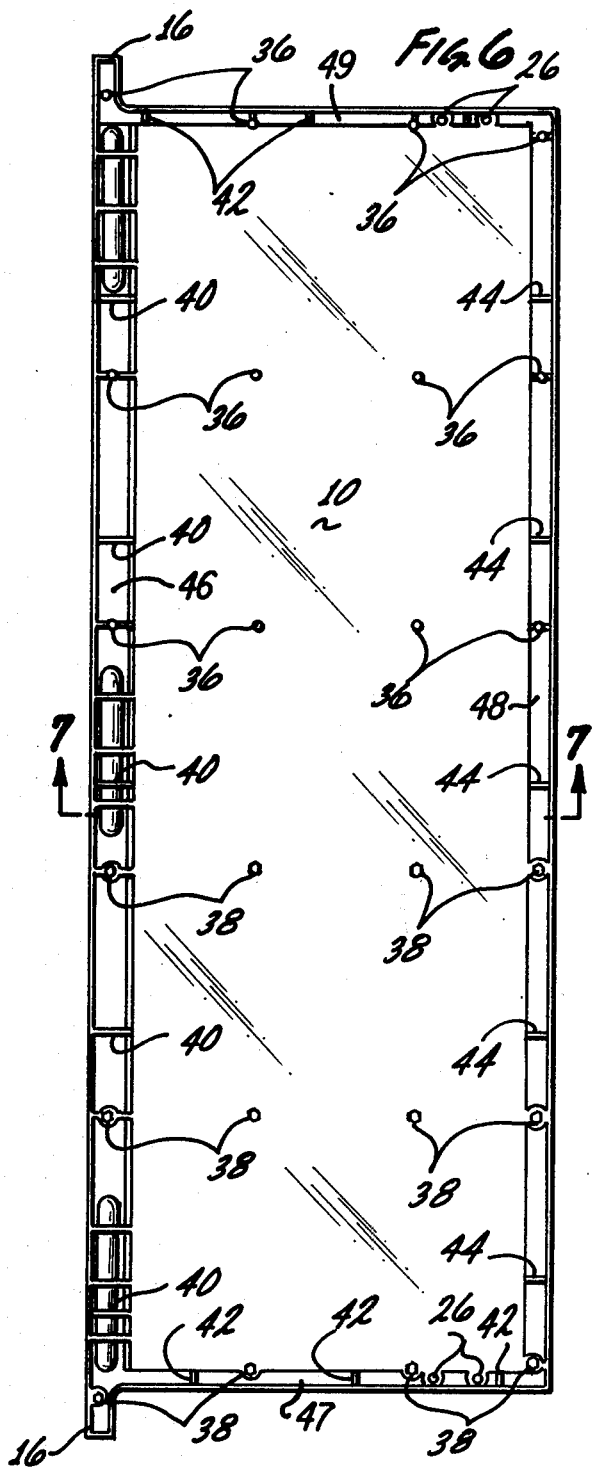

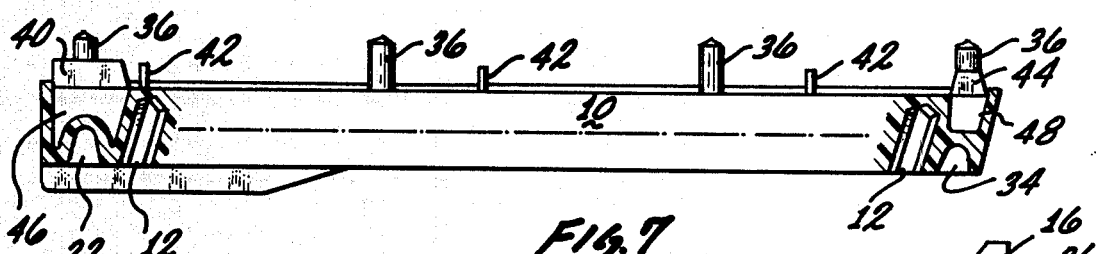
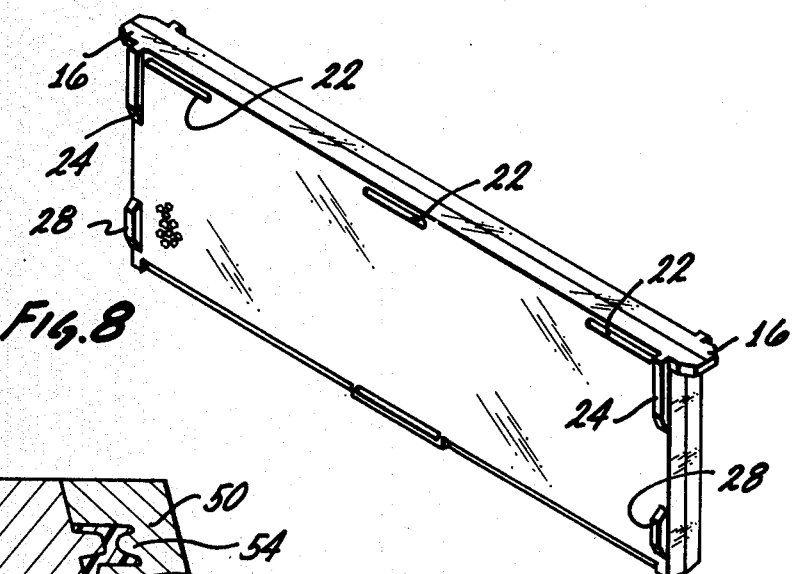
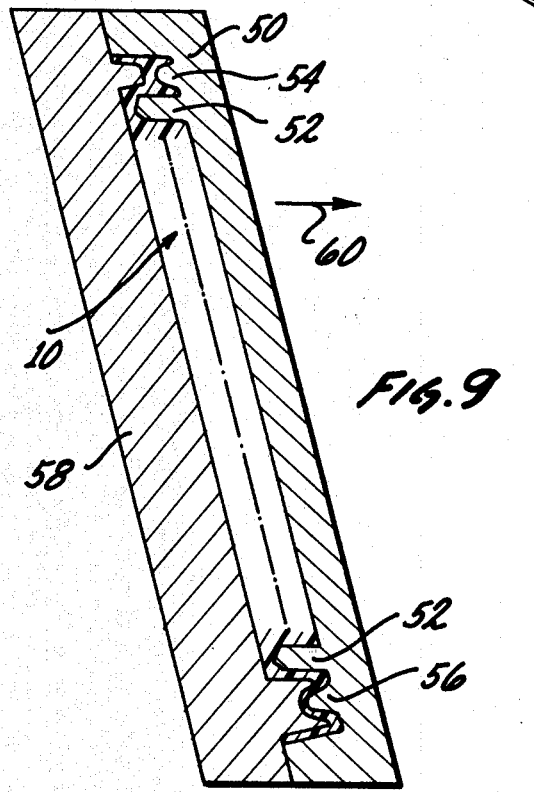
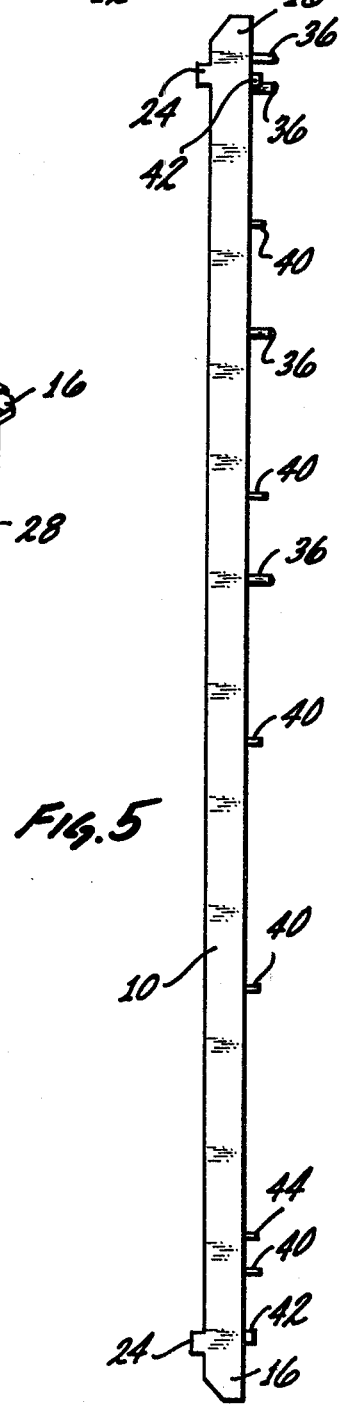

HONEYCOMB

BACKGROUND OF THE INVENTION

The present invention relates to an artificial honeycomb and specifically relates to an improved molded plastic honeycomb for use in replacing the existing wooden or plastic honeycombs currently in use.

In the prior art there have been previous attempts made to replace the natural combs formed by a colony of bees by supporting structures for use by the colony of bees to deposit honey. As an example, in the past, a plurality of wooden frames have been mounted in a super and with one or more supers used to form a beehive. The colony of bees would build up a wax foundation of cells to form the honeycomb and with the bees depositing the honey or their eggs in the built-up wax foundation. As a further improvement in the prior art, there have been bee comb foundation frames and with the foundation frames receiving a molded starter sheet of wax and with the bees building upon this starter sheet of wax to form the full honeycomb structure to receive the honey.

In other prior art structures, a molded plastic comb foundation having a cellular configuration is provided and with the bees building the remaining wax foundation upon the cellular configuration to form the individual honeycombs. In all of the prior art structures actually sold in the trade, the artificial honeycomb is not complete and the bees must still expend some time and energy in completing the foundation structure and must therefore build wax cells walls before honey can be deposited. It would be desirable to provide for an artificial molded honeycomb structure which is an accurate simulation of a natural cell so that the initial energy output from the bees is primarily for depositing honey and eggs rather than building the wax foundation.

SUMMARY OF THE INVENTION

The present invention provides for an artificial honeycomb formed from a molded plastic structure which provides for a cellular configuration having a full depth for each cell. With the honeycomb of the present invention there is no wasted energy by the bees to complete the foundation by building up wax to complete the depth of each cell. In addition, each cell of the artificial honeycomb of the present invention has a hexagonal configuration which is basically the same configuration for the cells that bees normally build in nature. Also, the sides of each cell of the artificial honeycomb of the present invention slope downward at an average angle of approximately twelve and one-half degrees ($12\frac{1}{2}°$) which is substantially the same angle for a natural cell. In addition, the bottom of each cell of the artificial honeycomb takes the shape of a truncated pyramid having opposite sides which subtend an angle of approximately one hundred twenty degrees (120°) which simulates the bottom configuration of a natural cell.

The molded honeycomb structure of the present invention provides for a very close simulation of a natural cell and therefore produces a maximum output of honey from the bees and with this output produced in a minimum time period during the time of normal honey flow. With the prior art structures using a foundation only, there is a period of approximately from seven to eight days for the bees to build the comb foundation before the depositing of honey. With the prior art prior molded cellular structures there is a period of approximately four days for the bees to finish building the foundation structure before the depositing of honey. With the present invention, the bees almost immediately start to deposit honey and eggs and there is essentially no time lost in building the foundation structure.

With the honeycomb structure of the present invention, the honeycomb is completely interchangeable with other frames currently in the field. In particular, the honeycomb structure of the present invention may be used to replace either the wood or plastic frames currently in use within the hive super. Also, with the prior structures there may be a wax loss due to disease or pesticides which would in turn decrease the output but since the bees provide almost no wax with the honeycomb of the present invention there is no such similar loss. Also with the prior art, before the honey is removed from the comb, there is often a step of cutting off the wax cap so that the honey may be spun out and removed without damaging the wax foundation frame. With the present invention it is not necessary to have a step of cutting off the wax cap since the honey and wax cap can be spun off at a high speed because there is no wax foundation to save. This eliminates a step and provides for an increase in the honey production by at least two to three percent since the honeycomb can be spun harder than the prior art combs.

In a particular molded structure for the honeycomb of the present invention, the comb is formed by two identical half sections having front (outer) and back (inner) faces and with the half sections locked together to have the back faces face each other. Each half section is made by forming a front mold plate having a hexagonal pin for every cell. Each pin is slightly tapered to provide ease in removing the molded part from the mold plate. The pins are at a twelve and one half degree ($12\frac{1}{2}°$) angle to the base of the front mold plate and during molding the mold plate is disposed at a twelve and one half degree ($12\frac{1}{2}°$) angle so that the front mold plate can be pulled straight from the molded half section. Each molded half section includes complementary locking portions on their back faces which snap together when one half section is turned one hundred eighty degrees (180°) to the other half section. Each pair of half sections snapped together thereby forms a full molded honeycomb. The locking portions may include pins and complementary openings and upstanding ribs and complementary recesses. The back faces of the half sections may have a recessed portion extending along the sides of the half section and with periodic rib members to give a combination of lightness, strength and a smooth outer surface.

The molded honeycomb of the present invention includes other improvements such as molded openings in the front faces for receiving a hive tool so that the honeycombs may be removed from the beehive super. Also the molded honeycombs may include upper integrally molded enlarged sections to provide for spacers between adjacent honeycombs in the beehive super. In addition, the structure of the present invention includes the use of a removable spacer so that a lower spacer may be used if desired. Other features of the molded honeycomb of the present invention include a recessed portion along the bottom edge on the front face to allow space for the bee to pass and an elongated opening along the bottom edge on the front face to serve as a support surface as the honeycombs are spun to remove the honey.

BRIEF DESCRIPTION OF THE DRAWINGS

A clearer understanding of the present invention will be had with reference to the following description and drawings wherein:

FIG. 2 is a front view of a half section of a honeycomb of the present invention;

FIG. 5 is a top view of the half section of the honeycomb of FIG. 2;

FIG. 6 is a back view of the half section of the honeycomb of FIG. 2;

FIG. 7 is a cross-sectional view of the half section taken along lines 7—7 of FIG. 6;

FIG. 8 is a perspective view of a full honeycomb of the present invention formed by two half sections; and FIG. 9 illustrates a structure for molding an individual half section of the honeycomb of the present invention.

DESCRIPTION OF THE PREFERRED EMBODIMENT

Figure 1:
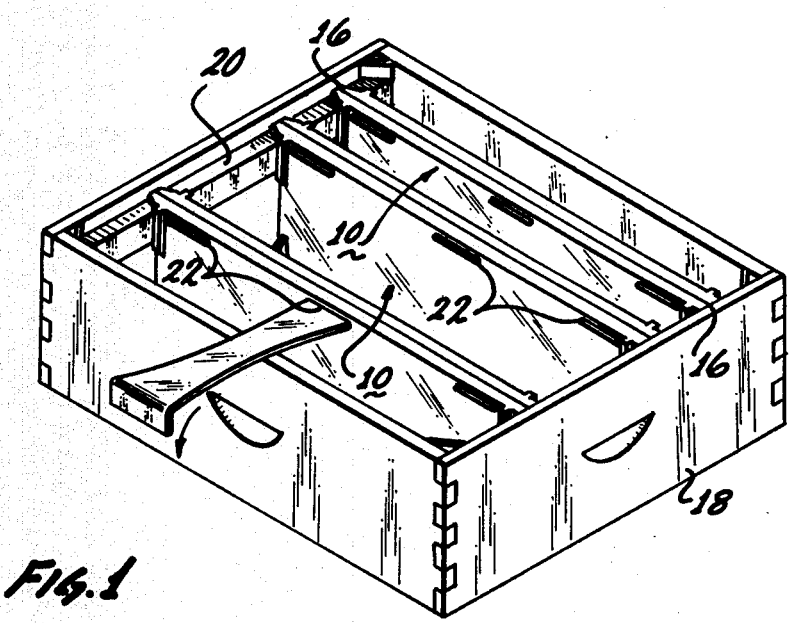
FIG. 1 is a perspective view of a typical beehive super which may be used to support individual molded honeycombs constructed in accordance with the teachings of the present invention.
Figure 3:
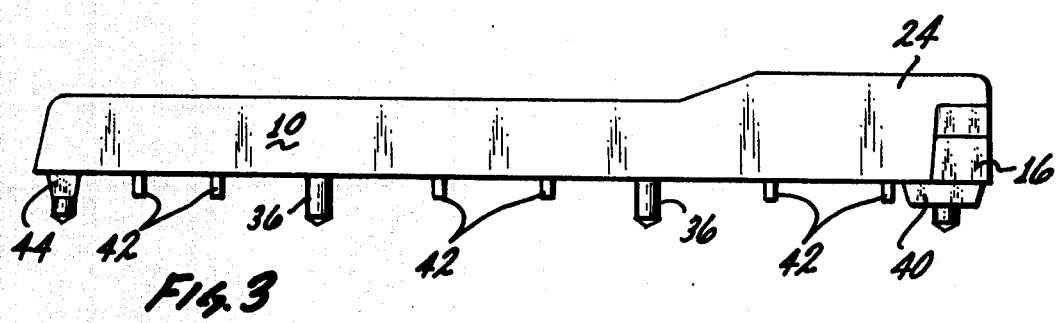
FIG. 3 is an end view of the half section of FIG. 2.
Figure 4:
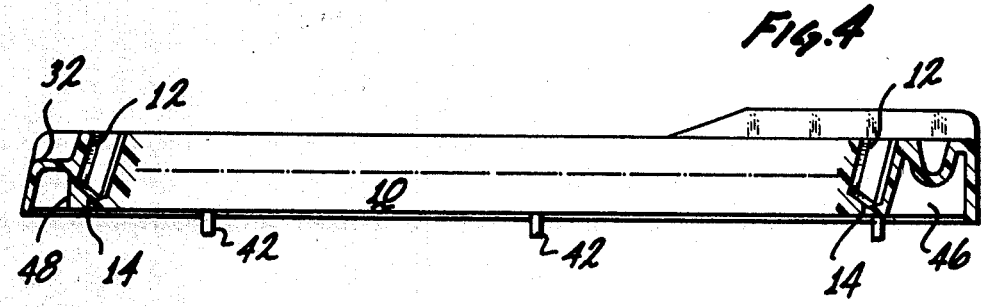
FIG. 4 is a cross-sectional view of the half section taken along lines 4—4 of FIG. 2.

In the Figures, a preferred embodiment of a molded plastic honeycomb constructed in accordance with the present invention is shown, and each honeycomb is formed by a pair of molded half sections 10. As seen in FIG. 1, each half section 10 is generally of rectangular configuration and includes a plurality of hexagonal openings 12 regularly spaced along the front or outer face and with each opening serving as a cell for the reception of honey or brood. As seen in FIGS. 4 and 7, each opening 12 is sloped downward and in particular has a downward slope of approximately twelve and one half degrees ($12\frac{1}{2}°$). Natural honeycombs have cells which typically have an average downward slope of twelve and one half degrees ($12\frac{1}{2}°$).

The bottom of each hexagonally shaped opening 12 is formed as a truncated pyramid 14 having opposite sides subtending an angle of approximately one hundred twenty degrees (120°). This simulates the bottom of a natural cell. In addition, each opening 12 is formed to have a depth which is approximately the same as the full depth for a natural cell produced by the bees in nature. The depth of each cell may be approximately one half inch ($\frac{1}{2}"$). Also, the opposite sides of the cells 12 are slightly tapered relative to each other so as to allow for the removal of each half section from a mold plate. Therefore, when using the honeycomb of the present invention, the bees do not have to expend energy in building up a wax foundation to form or complete a cell, as with the prior art structure, but the bees can immediately begin to deposit honey or eggs in the cells 12.

As shown in the Figures, each half section 10 includes arms 16 so that the complete honeycombs may be supported within a hive super such as the hive super 18 shown in FIG. 1. As can be seen in FIG. 1, the hive super 18 includes end walls and side walls and is open on its upper and lower sides. The hive supers 18 may be stacked one on top of each other in a known manner so as to form a complete beehive. The inner edge of each end wall is rabbeted as shown at position 20 to form a ledge to support the arms 16 of each honeycomb. Each half section 10 forming the honeycomb may also include elongated openings 22 which are used in association with a hive tool as shown in FIG. 1 so as to pry up the honeycombs for inspection or when they are filled with honey and are ready for removal from the hive super 18.

In order to ensure proper spacing between each half section 10 forming the honeycomb, integral spacers 24 are molded at the top portions of each half section adjacent the extended arms 16. The integral spacers 24 provide that the honeycombs at their top ends must be spaced from each other by at least a minimum distance equal to twice the depth of each spacer 24. The half sections forming the honeycomb 10 may also include openings 26 for receiving a removable spacer such as removable spacers 28 shown adjacent the openings 26. It can be seen that the removable spacers include pin members 30 which snap into the openings 26 and provide for spacing at the bottom portion of the honeycombs.

Along the bottom edge of the half sections 10 forming the honeycomb are a pair of elongated recessed portions 32 which provide clearance for the bees at this bottom portion. Also, along the bottom edge of the half sections 10 is an elongated opening 34 which may serve to receive a tool to hold the honeycomb while the honeycomb is spun to remove the honey.

As shown in FIG. 6, the back or inner face of the molded half section 10 includes a plurality of pins 36 arranged essentially in three rows and with the three rows of pins 36 arranged to one end of the half section 10. Complementary rows of openings 38 are arranged to the other end of the half section 10. It can be seen that if two half sections 10 are turned one hundred eighty degrees (180°) to each other so that their back faces face each other, the pins 36 of one half section will mate with the openings 38 of the other half section and the pins of the other half section will mate with the openings of the one half section. The pins 36 and openings 38 will therefore provide for the two half sections being locked together.

As shown in FIGS. 4, 6 and 7 the upper edge of the half section 10 includes a recess 46 in the back face and the bottom edge also includes a recess 48 in the back face. In addition, there are similar recesses 47 and 49 along the side edges of the half section 10 in the back face. These recesses 46 through 49 provide for each half section being light in weight. The half sections also include reinforcing ribs extending along the edges of the half section within the recesses 46 through 49 and with at least some of the reinforcing ribs including upstanding portions such as upstanding portions 40 along the top edge, 42 along the side edges and 44 along the bottom edges. The upstanding portions 40, 42 and 44 are offset along the recesses so that when two half sections are mated, the upstanding portions are received within the recesses to provide additional locking.

As the half sections are snapped together, the pins 36 are received in the openings 38 and the upstanding portions 40, 42 and 44 are received within the recesses 46, 47, 48 and 49 so that a lightweight unitary honeycomb structure is produced having a flush edge as shown in FIG. 8. Since hexagonal cells 12 on both outer faces of the honeycomb slope downward at the proper angle, it would be difficult to make the full flush lightweight honeycomb structure as shown in FIG. 8 in a single molding operation.

With the use of the half sections as shown in the present invention, the mold plate which contains the hexagonal pins may be placed at a twelve and one half degree (12½°) angle so that the mold plate may be pulled straight from the molded half section. This may be seen, for example, with reference to FIG. 9 wherein the half section 10 is shown being molded by a molding structure including a front mold plate 50 having a plurality of pins 52 to form the hexagonal cells 12 and members 54 and 56 to form the openings and recesses 22, 32 and 34.

A back mold plate 58 may be permanently fixed and includes a surface configuration to form the back surface of the half section 10 as shown in FIGS. 4, 6 and 7. The back mold plate 58 includes various extending and recessed portions to provide for the pins, openings, ribs and recesses in the back surface. After the half section 10 is molded, the mold plate 50 is pulled outward in a straight direction as shown by arrow 60 so that the front surface of the half section is formed. The half section 10 may then be ejected from the back mold plate 58 by ejector pins (not shown). Two such molded half sections 10 are then snapped together using the complementary pins and openings and the extending rib portions and recesses as described above to form the complete molded honeycomb as shown in FIG. 8.

The complete molded honeycomb as shown in FIG. 8 includes an array of hexagonal cells of full depth, at a proper angle and having the normal truncated bottom of a natural cell. The honeycomb therefore prevents waste since the honeycomb is almost a perfect simulation of a natural cell and the bee does not have to build up any wax foundation. As indicated above, with the prior art wood foundations, it required approximately seven to eight (7-8) days for the bees to build the proper wax comb foundation. With the prior art molded plastic combs, it still required approximately some time such as four (4) days to build on top of the plastic structure to finish a proper wax foundation.

With the present invention, the bees almost immediately start to deposit honey, or lay eggs to build brood and there is no necessity for the bees to build up any wax except the wax that is used to cap off each cell. In the prior art it was necessary to include a step of cutting off this wax cap so that the honey would more easily flow out of the cell. This step was to assure that as the comb was spun to remove the honey, the honey would easily flow and the spinning would not destroy the wax foundation. With the honeycomb of the present invention, it is not necessary to cut off the cap and the honeycomb also may be spun at a higher rate so as to remove all of the honey. With the honeycomb of the present invention, the honey production may thereby be increased over the honey production produced from prior art honeycombs.

The present invention therefore provides for an improved lightweight honeycomb having a flush outer edge surface and which provides for an accurate simulation of a natural cell and which may be used interchangeably with other honeycomb frames currently in the field.

Although the invention has been described with references to a particular embodiment, it is to be appreciated that various adaptations and modifications may be made and the invention is only to be limited by the appended claims.

I claim:

1. A molded plastic honeycomb formed by two substantially identical unitary molded half sections, and with each unitary molded half section including
   a front face and a back face,
   the front face including a plurality of integrally molded regularly spaced full depth hexagonally shaped cells extending inwardly from the front face and with each cell sloping downward at an angle substantially equal to the angle of a natural honeycomb cell and with the bottom wall of each cell formed as a truncated pyramid substantially similar to the shape of a natural honeycomb cell and with the depth of each cell substantially equal to the depth of a natural honeycomb cell,
   the front face also including integrally molded outwardly extending spacer portions for providing a predetermined spacing between adjacent honeycombs, and
   the back face including complementary locking portions for providing locking between the complementary locking portions of the back faces of two half sections to produce a single plastic honeycomb from the two unitary molded half sections and with the plastic honeycomb having opposite front faces including the full depth hexagonally shaped cells for the immediate depositing of honey or eggs for brood rearing and wherein the complementary locking portions include rib portions extending outwardly from the back face and complementary recesses in the back faces and with the extending rib portions and the recesses positioned along the edges of the half section so that one half section rotated 180° will mate with another identical half section to form the complete honeycomb.

2. The molded plastic honeycomb of claim 1 wherein the front face additionally includes integrally molded elongated openings located adjacent a top edge of the half section for receiving a hive tool for removing the honeycomb from a hive super.

3. The molded plastic honeycomb of claim 1 wherein the front face additionally includes at least one means for receiving an additional removable spacer means for providing the predetermined spacing in association with the integrally molded spacer portions.

4. The molded plastic honeycomb of claim 1 wherein the integrally molded spacer portions extend outwardly from the front face adjacent to the side edges of the half section.

5. The molded plastic honeycomb of claim 1 wherein the front face additionally includes integrally molded relieved portions extending along the bottom edge of the half section.

6. The molded plastic honeycomb of claim 1 wherein the complementary locking portions include pins extending outwardly from the back face and complementary openings in the back face and with the pins and openings positioned so that one half section rotated 180° will mate with another identical half section to form the complete honeycomb.

7. The molded plastic honeycomb of claim 1 wherein each cell slopes downward at an angle of approximately 12½°, the opposite sides of the truncated pyramid subtend an angle of approximately 120° and the depth of each cell is approximately ½ inch.

8. A molded plastic honeycomb for use in a hive super including
   molded outer faces spread from and substantially parallel to each other and with each outer face including a plurality of integrally molded regularly spaced full depth hexagonally shaped cells extending inwardly and with each cell sloping downward at an angle substantially equal to the angle of a natural honeycomb cell and with the bottom wall of each cell formed as a truncated pyramid substantially similar to the shape of a natural honeycomb cell and with the depth of each cell substantially equal to the depth of a natural honeycomb cell, each outer face also including integrally molded elongated openings located adjacent a top edge of the molded honeycomb for receiving a hive tool for removing the molded honeycomb from a hive super, and arm members integrally molded with and outwardly extending from the sides of the molded plastic honeycomb and with each arm member at an upper position along a side and with the arm members for use in supporting the molded plastic honeycomb within the hive super, and the honeycomb formed from two substantially identical molded half sections each having an inner face and additionally including locking means for providing locking between the two half sections and with the inner faces facing each other and wherein the locking means include rib portions extending outwardly from each inner face and complementary recesses in each inner face and with the extending rib portions and the recesses positioned along the edges of the half sections so that one half section rotated 180° will mate with another identical half section to form the complete honeycomb.

9. The molded plastic honeycomb of claim 8 wherein each molded outer face additionally includes integrally molded outwardly extending spacer portions for providing a predetermined spacing between adjacent honeycombs supported within the hive super.

10. The molded plastic honeycomb of claim 9 wherein
each outer face additionally includes at least one means for receiving an additional removable spacer means for providing the predetermined spacing in association with the integrally molded spacer portions.

11. The molded plastic honeycomb of claim 9 wherein
the integrally molded spacer portions extend outwardly from the outer faces adjacent to the side edges of the honeycomb.

12. The molded plastic honeycomb of claim 8 wherein
the outer faces additionally include integrally molded relieved portions extending along the bottom edge of the honeycomb.

13. The molded plastic honeycomb of claim 8 wherein
the locking means include pins extending outwardly from each inner face and complementary openings in each inner face and with the pins and openings positioned so that one half section rotated 180° will mate with another identical half section to form the complete honeycomb.

14. The molded plastic honeycomb of claim 8 wherein
each cell slopes downward at an angle of approximately 12½°, the opposite sides of the truncated pyramid subtend an angle of approximately 120° and the depth of each cell is approximately ½ inch.

15. A molded plastic honeycomb formed by two substantially identical half sections, and with each half section including
a front face and a back face,
the front face including a plurality of regularly spaced hexagonally shaped cells extending inwardly from the front face and with each cell having a size, shape and configuration substantially equal to the size, shape and configuration of a natural honeycomb cell,
the backface including elongated recesses extending along the top, bottom and side edges of the half section to lighten the weight of the half section and with the top, bottom and sides having substantially flush surfaces and additionally including rib members periodically spaced along the elongated recesses, and
locking portions for providing locking between the back faces of two half sections to produce a single plastic honeycomb from the two half sections and with the plastic honeycomb having opposite front faces including the cells for the immediate depositing of honey or eggs.

16. The molded plastic honeycomb of claim 15 wherein
the front face additionally includes elongated openings located adjacent at top edge of the half section for receiving a hive tool for removing the honeycomb from a hive super.

17. The molded plastic honeycomb of claim 15 wherein
the front face additionally includes spacer portions for providing a predetermined spacing between adjacent honeycombs.

18. The molded plastic honeycomb of claim 15 wherein
the front face additionally includes relieved portions extending along the bottom edge of the half section.

19. The molded plastic honeycomb of claim 15 wherein
the locking portions include pins extending outwardly from the back face and complementary openings in the back face and with the pins and openings positioned so that one half section rotated one hundred eighty degrees (180°) will mate with another identical half section to form the complete honeycomb.

20. The molded plastic honeycomb of claim 15 wherein
the locking portions include rib portions extending outwardly from the back face from at least some of the rib members and with the extending rib portions positioned along the edges of the half section to be received within the recesses so that one half section rotated one hundred eight degrees (180°) will mate with another identical half section to form the complete honeycomb.

* * * * *